United States Patent
Morita et al.

(10) Patent No.: US 10,647,225 B2
(45) Date of Patent: May 12, 2020

(54) VEHICLE SEAT

(71) Applicant: TOYOTA BOSHOKU KABUSHIKI KAISHA, Aichi-ken (JP)

(72) Inventors: Tomoharu Morita, Gifu-ken (JP); Naoki Mitsuoka, Aichi-ken (JP); Hideyuki Izukawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/847,131

(22) Filed: Dec. 19, 2017

(65) Prior Publication Data

US 2018/0178680 A1 Jun. 28, 2018

(30) Foreign Application Priority Data

Dec. 22, 2016 (JP) .................. 2016-249048

(51) Int. Cl.
| | |
|---|---|
| *B60N 2/20* | (2006.01) |
| *B60N 2/22* | (2006.01) |
| *B60N 2/60* | (2006.01) |
| *B60N 2/12* | (2006.01) |
| *B60N 2/58* | (2006.01) |

(52) U.S. Cl.
CPC .............. *B60N 2/20* (2013.01); *B60N 2/12* (2013.01); *B60N 2/2245* (2013.01); *B60N 2/5883* (2013.01); *B60N 2/6009* (2013.01)

(58) Field of Classification Search
CPC ........... B60N 2/20; B60N 2/5883; B60N 2/12
USPC .................... 297/1, 2, 217.1, 219.1
See application file for complete search history.

(56) References Cited

U.S. PATENT DOCUMENTS

2007/0040418 A1* 2/2007 Ohkuma ............... B60K 1/04
297/15
2010/0259081 A1 10/2010 Kuno

FOREIGN PATENT DOCUMENTS

| CN | 1257071 C | 5/2006 |
|---|---|---|
| CN | 100420595 C | 9/2008 |
| CN | 204895212 U | 12/2015 |
| CN | 205417248 U | 8/2016 |
| DE | 102010052455 A1 | 5/2012 |
| EP | 0565430 A1 | 10/1993 |
| JP | S58-039535 A | 3/1983 |
| JP | 2002-067762 A | 3/2002 |
| JP | 2005-119499 A | 5/2005 |
| JP | 2010-246599 A | 11/2010 |

(Continued)

OTHER PUBLICATIONS

Chinese Office Action in counterpart Chinese Application No. 2017/11383702.2, dated Nov. 1, 2019, and corresponding English translation thereof.

*Primary Examiner* — Justin V Lewis
(74) *Attorney, Agent, or Firm* — Greenblum & Bernstein, P.L.C.

(57) ABSTRACT

A vehicle seat includes: a component part formed to be displaceable relative to a vehicle body; and a board member configured to cover a gap formed between the component part and the vehicle body. The board member is a flexible plate-shaped member. The board member includes an attachment portion configured to rotatably connect the board member to the component part or the vehicle body, and a sliding portion configured to rotate around the attachment portion as an axis so as to abut with the vehicle body or the component part and slide according to the displacement of the component part.

6 Claims, 9 Drawing Sheets

(56) References Cited

FOREIGN PATENT DOCUMENTS

| JP | 2014-004881 A | 1/2014 |
|----|---------------|--------|
| JP | 2014-091371 A | 5/2014 |

\* cited by examiner

FIG. 4
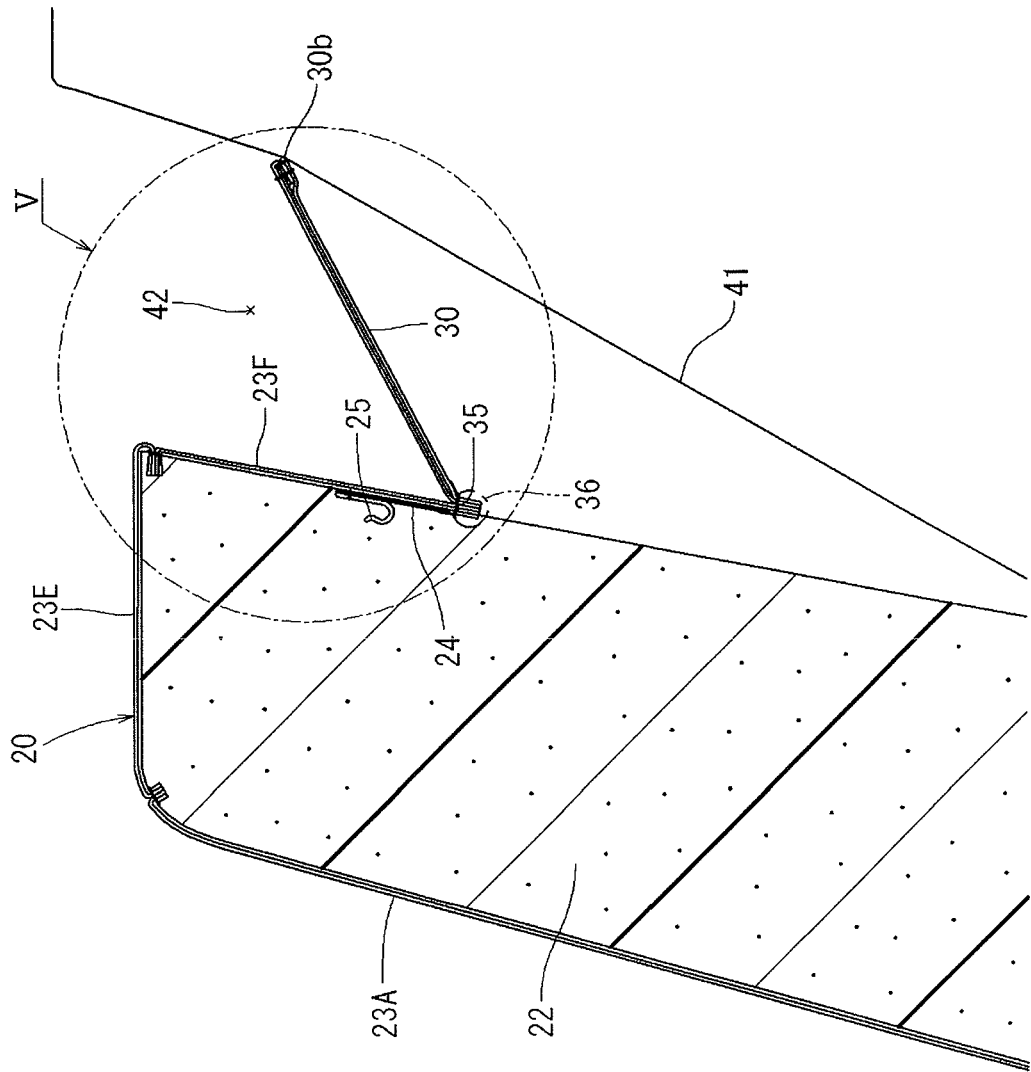
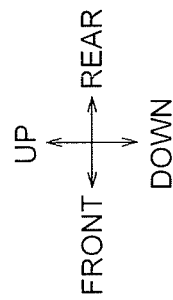

VEHICLE SEAT

INCORPORATION BY REFERENCE

The disclosure of Japanese Patent Application No. 2016-249048 filed on Dec. 22, 2016 including the specification, drawings and abstract is incorporated herein by reference in its entirety.

BACKGROUND

1. Technical Field

The present disclosure relates to a vehicle seat.

2. Description of Related Art

There is a vehicle seat component as a component part for a vehicle seat attached to a vehicle body. In a case where the vehicle seat component separates from or comes closer to the vehicle body, a gap is formed between the vehicle seat component and the vehicle body. There has been known a structure that covers the gap so as not to be visible from outside. In a seatback 100 of an automotive rear seat in the related art as illustrated in FIG. 9, a gap hiding cover 120 is attached to cover a gap between a partition panel 110 and an upper part of the seatback 100. The partition panel 110 partitions a passenger compartment from a trunk. More specifically, the seatback 100 is attached to an automotive body in a reclining operable manner in a front-rear direction. A case where an inclination angle of the seatback 100 is at a standard position is indicated by a continuous line. In this case, a front end of the gap hiding cover 120 is fixed to the upper part of the seatback 100 by a clip 122 via a plate 121. A rear end of the gap hiding cover 120 is fixed to a partition panel 110 by a clip 122 via a plate 121 with a predetermined sag. As indicated by an alternate long and two short dashes line, when the seatback 100 is tilted forward from the standard position, the gap hiding cover 120 is unfolded between the upper part of the seatback 100 and the partition panel 110. Further, although not illustrated herein, when the seatback 100 is tilted backward from the standard position so that its rear face is brought into contact with the partition panel 110, the gap hiding cover 120 is folded between the seatback 100 and the partition panel 110. Accordingly, the gap hiding cover 120 covers a gap formed between the upper part of the seatback 100 and the partition panel 110, so that an inner part below the gap is hidden from outside. Further, Japanese Patent Application Publication No. 2014-91371 (JP 2014-91371 A) discloses a similar technique to cover a gap formed between a seat cushion and a floor.

SUMMARY

In the related art, the ends of the gap hiding cover 120 should be fixed to both the seatback 100 and the partition panel 110. In order to attach the gap hiding cover 120 with a good outward appearance, it is necessary to place their fixation parts in parts that can be hardly visible from outside. This decreases attachment workability. Meanwhile, if the attachment workability is given priority, the outward appearance is deteriorated. Thus, there is such a problem that it is difficult to balance the outward appearance with the attachment workability.

In view of such a problem, an object of the present disclosure is to provide a vehicle seat in which a component part of the vehicle seat separates from and comes closer to a vehicle body, the vehicle seat having a gap hiding structure that balances an outward appearance with attachment workability.

A vehicle seat according to an aspect of the disclosure includes a component part formed to be displaceable relative to a vehicle body and a board member configured to cover a gap formed between the component part and the vehicle body. The board member is a flexible plate-shaped member and is placed between the component part and the vehicle body. The board member includes an attachment portion configured to rotatably connect the board member to the component part or the vehicle body, and a sliding portion configured to rotate around the attachment portion as an axis so as to abut with the vehicle body or the component part and slide according to a displacement of the component part.

In a state where the component part is separated from the vehicle body, the board member may be unfolded to cover the gap. In a state where the component part comes closer to the vehicle body, the board member may be folded toward the component part or the vehicle body to which the board member is connected.

In the above aspect, when the component part is displaced relative to the vehicle body, the sliding portion slides along the vehicle body or the component part, so that the board member rotates around the attachment portion as an axis, and thus, the board member can always cover and hide the gap formed between the component part and the vehicle body. Further, the attachment of the board member to the vehicle body is performed such that the component part is attached to the vehicle body in a state where the attachment portion is attached to the component part or the vehicle body and the sliding portion is brought into contact with the vehicle body or the component part, thereby making it possible to achieve a good attachment workability. Hereby, it is possible to provide a vehicle seat having a gap hiding structure that balances outward appearance and attachment workability. Note that the "vehicle body" shall include a state where a component such as a trim component attached to the vehicle body is attached.

The board member may be configured such that a plate material made of resin is covered with a skin material.

With the above aspect, it is possible to form the board member with a light weight and a good outward appearance.

The component part may be a seatback tiltable relative to the vehicle body. The board member may cover the gap formed between an upper part of the seatback and the vehicle body.

The attachment portion may be a sewing line formed such that a first end side of the skin material is connected by sewing to a skin of a back face of the seatback. The sliding portion may be a second end of the skin material, the second end being configured to slide over the vehicle body.

In the above aspect, the board member rotates around the attachment portion attached to the back face of the seatback as an axis and the sliding portion slides along a surface of an upper part of the vehicle body according to tilting of the seatback. Accordingly, even if an inclination angle of the seatback is changed, the gap formed between the upper part of the seatback and the vehicle body is covered by the board member and an inner structure is not visible, so that a good outward appearance can be achieved. The attachment portion is configured such that a first end side of the skin material covering the board member is hingedly connected by sewing to the skin of the back face of the seatback, so that any other component is not required, thereby achieving a simple and lightweight structure. Further, when the seatback is attached to the vehicle body, in a state where the board member is attached to the back face of the seatback, the sliding portion is brought into contact with the upper part of the vehicle body, and the seatback is attached. Thus, good attachment workability is achieved.

A horizontal section of a back face of an upper part of the seatback may be formed into a projecting shape which projects toward an opposite direction to a sitting face. The board member may be configured to curve along the projecting shape when the board member comes closer to the back face of the seatback in an overlapped manner.

In the above aspect, when the seatback is tilted and comes closer to the vehicle body in an overlapped manner, the board member curves along the projecting shape of the back face of the seatback. Hereby, the gap formed between the upper part of the seatback and the vehicle body is hidden efficiently, and thus, the outward appearance improves.

The board member may be biased to rotate in an unfolded direction.

In the above aspect, the sliding portion of the board member easily abuts with the component part or the vehicle body. Accordingly, the sliding portion slides in a state that the gap is hidden in the course where the component part is displaced relative to the vehicle body. This can stably obtain a good outward appearance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a sectional view taken along a line IV-IV in FIG. 1 and illustrates a state where an inclination angle of the seatback is at a standard position;

DETAILED DESCRIPTION OF EMBODIMENTS

FIGS. 1 to 8 illustrate one embodiment of the present disclosure. This embodiment is an example in which the present disclosure is applied to an automotive rear seat 1. In each of the figures, each direction of an automobile and the automotive rear seat 1 at the time when the automotive rear seat 1 is attached to the automobile is indicated by an arrow. In the following description, a description related to a direction shall be made on the basis of this direction. The automotive rear seat 1 of the present embodiment includes: a seat cushion 10 serving as a seat portion for a sitting occupant; a seatback 20 serving as a backrest for the sitting occupant; and a board member 30 for gap hiding, attached to a rear face (a back face) of an upper part of the seatback 20. A headrest is attached to the upper part of the seatback 20, but is omitted herein because it does not have direct relation with the present embodiment. Here, the automotive rear seat 1 and the seatback 20 correspond to an example of a "vehicle seat" and an example of a "component part," respectively.

Figure 1:
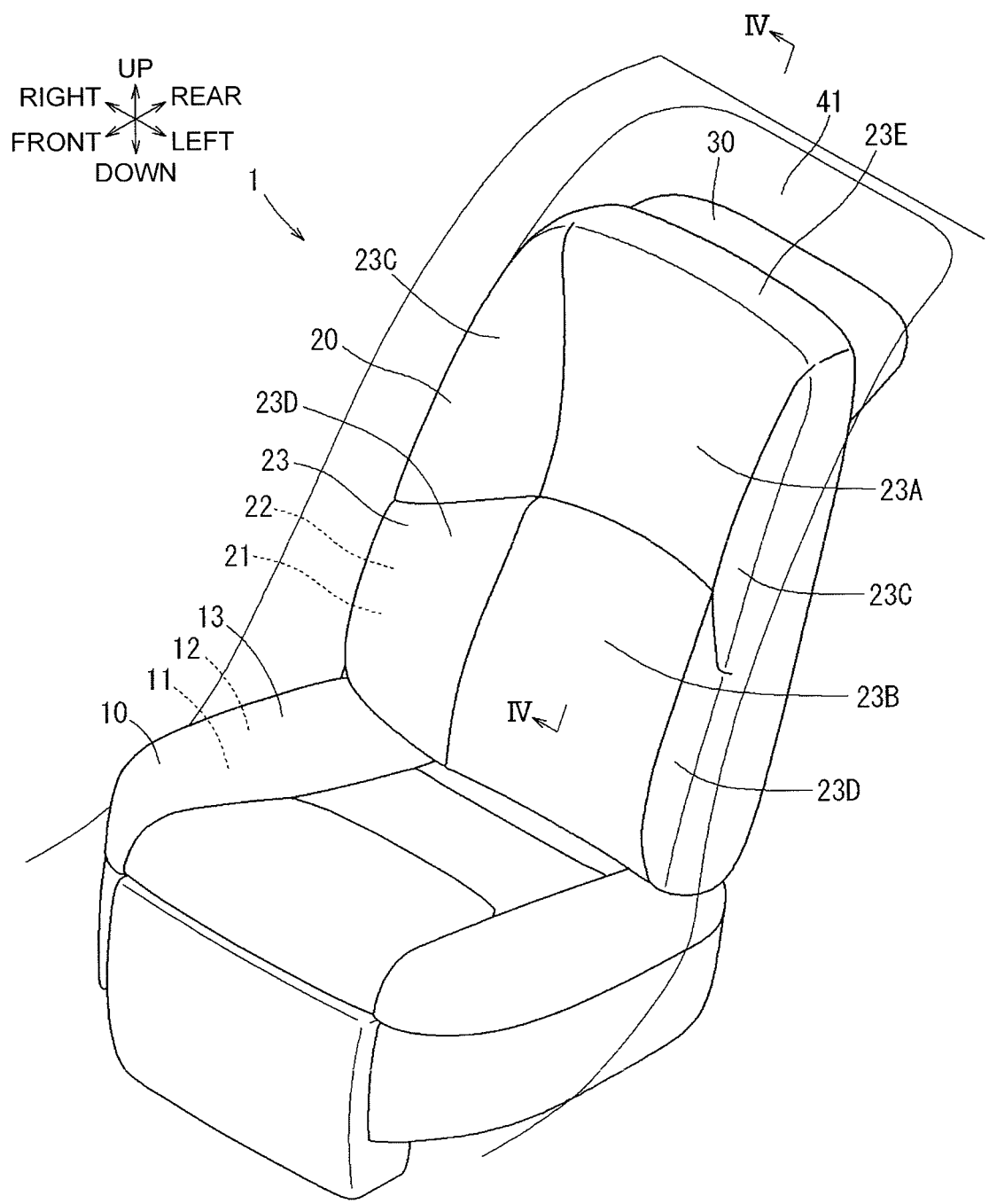
FIG. 1 is a perspective view of an automotive rear seat according to one embodiment of the present disclosure when viewed from a diagonally front side.

As illustrated in FIG. 1, the seat cushion 10 includes a cushion frame 11 forming a framework, a cushion pad 12 as a cushion material, and a cushion cover 13 as a skin material. The cushion frame 11 is disposed via a slide rail (not shown) so as to be movable in a front-rear direction relative to an automotive body. The seatback 20 includes a back frame 21 forming a framework, a back pad 22 as a cushion material, and a back cover 23 as a skin material. The back frame 21 is connected to the cushion frame 11 via a link mechanism (not shown), and is configured such that: when the cushion frame 11 is moved backward, the back frame 21 is tilted forward; and when the cushion frame 11 is moved forward, the back frame 21 is tilted backward. That is, the back frame 21 is tiltably attached to the automotive body. This mechanism is equivalent to one disclosed in Japanese Patent Application Publication No. 2010-246599 (JP 2010-246599 A) and has a well-known configuration, so a detailed description thereof is omitted.

As illustrated in FIGS. 1 to 5, the back cover 23 of the seatback 20 is configured such that a plurality of parts constituted by planar bodies in which a skin 23a as a decoration material, a cover pad 23b, and a back base fabric 23c are laminated in this order are sewn integrally. In the present embodiment, genuine leather is used as the skin 23a, but the skin 23a is not limited to genuine leather, and fabric, synthetic leather, and the like may be used. A top portion of the back cover 23 is formed such that parts such as a top main upper part 23A, a top main lower part 23B, right and left top side upper parts 23C, right and left top side lower parts 23D, a frame part 23E, and a back upper part 23F are integrated by sewing. The top main upper part 23A and the top main lower part 23B are parts abutting with a back face of an upper body of the sitting occupant. Further, the right and left top side upper parts 23C and the right and left top side lower parts 23D are parts placed on opposite sides, in a right-left direction, of the top main upper part 23A and the top main lower part 23B and abutting with sides of the upper body of the sitting occupant. The frame part 23E is a part covering a top face portion and both right and left side face portions of the seatback 20. The back upper part 23F is a part covering an upper part of a back face of the seatback 20.

Figure 3:
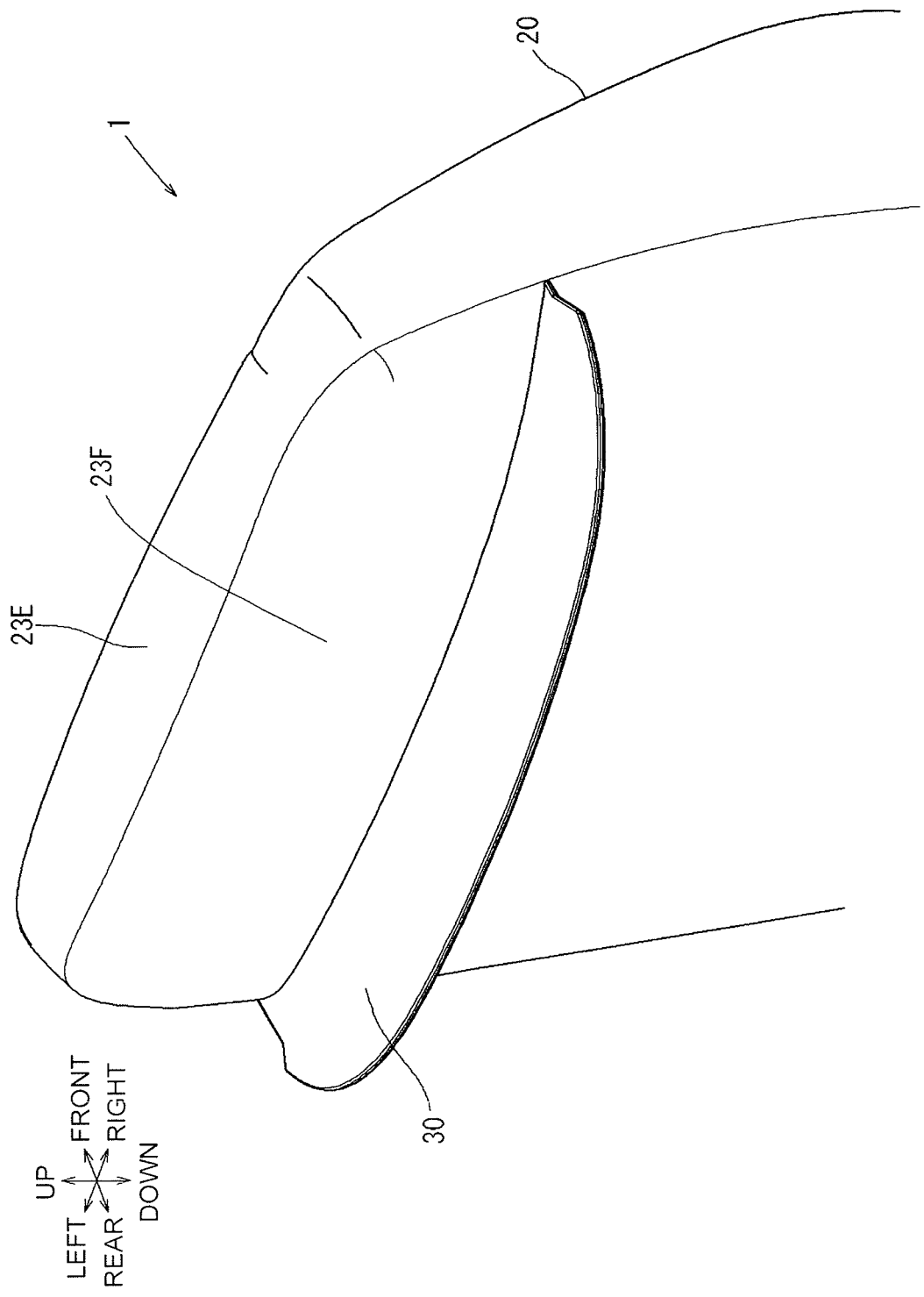
FIG. 3 is a perspective view of a state where a board member is attached to an upper part of the seatback of the automotive rear seat according to the embodiment when viewed from the diagonally rear side.
Figure 5:
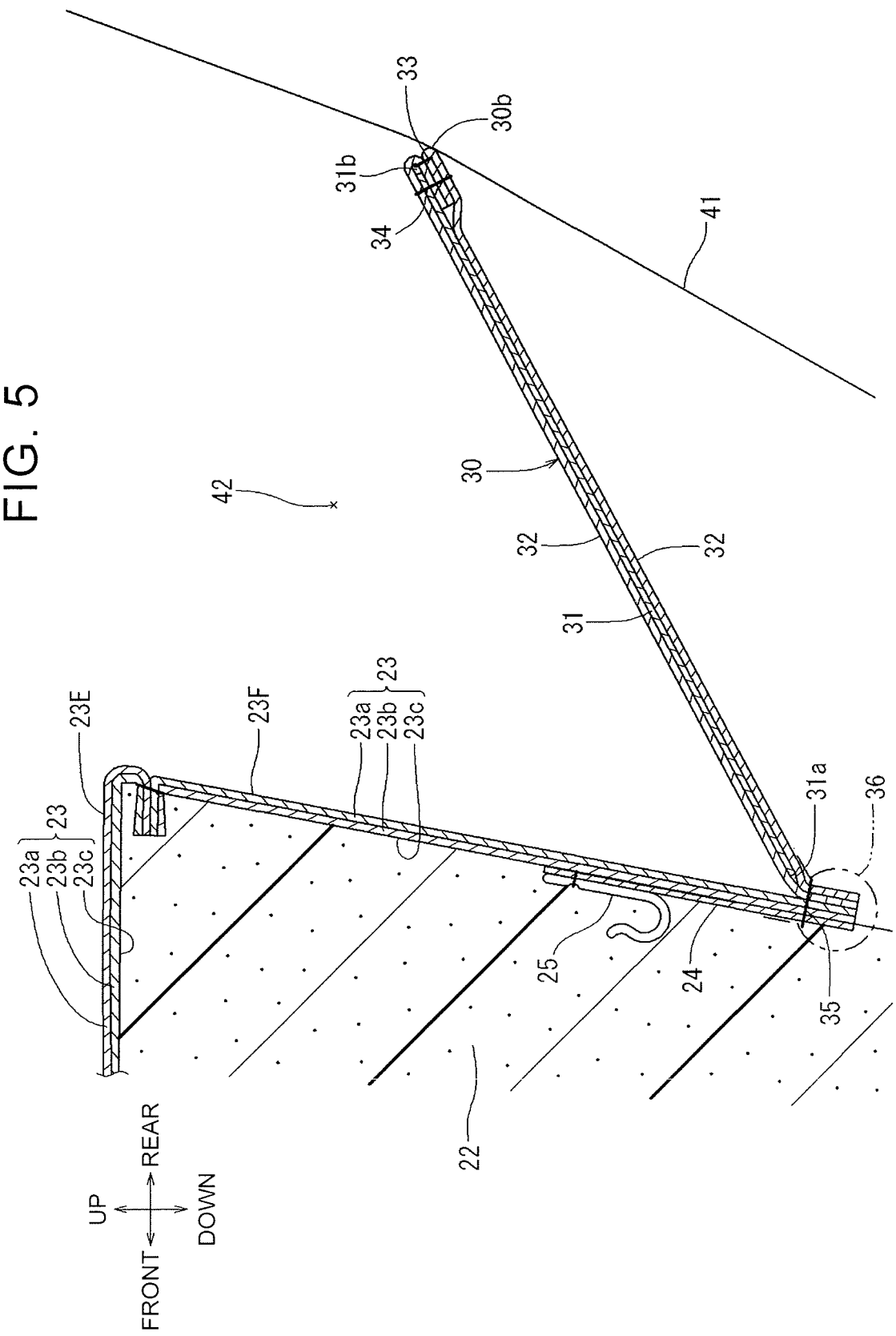
FIG. 5 is a sectional view of a part V in FIG. 4 in an enlarged manner.
Figure 6:
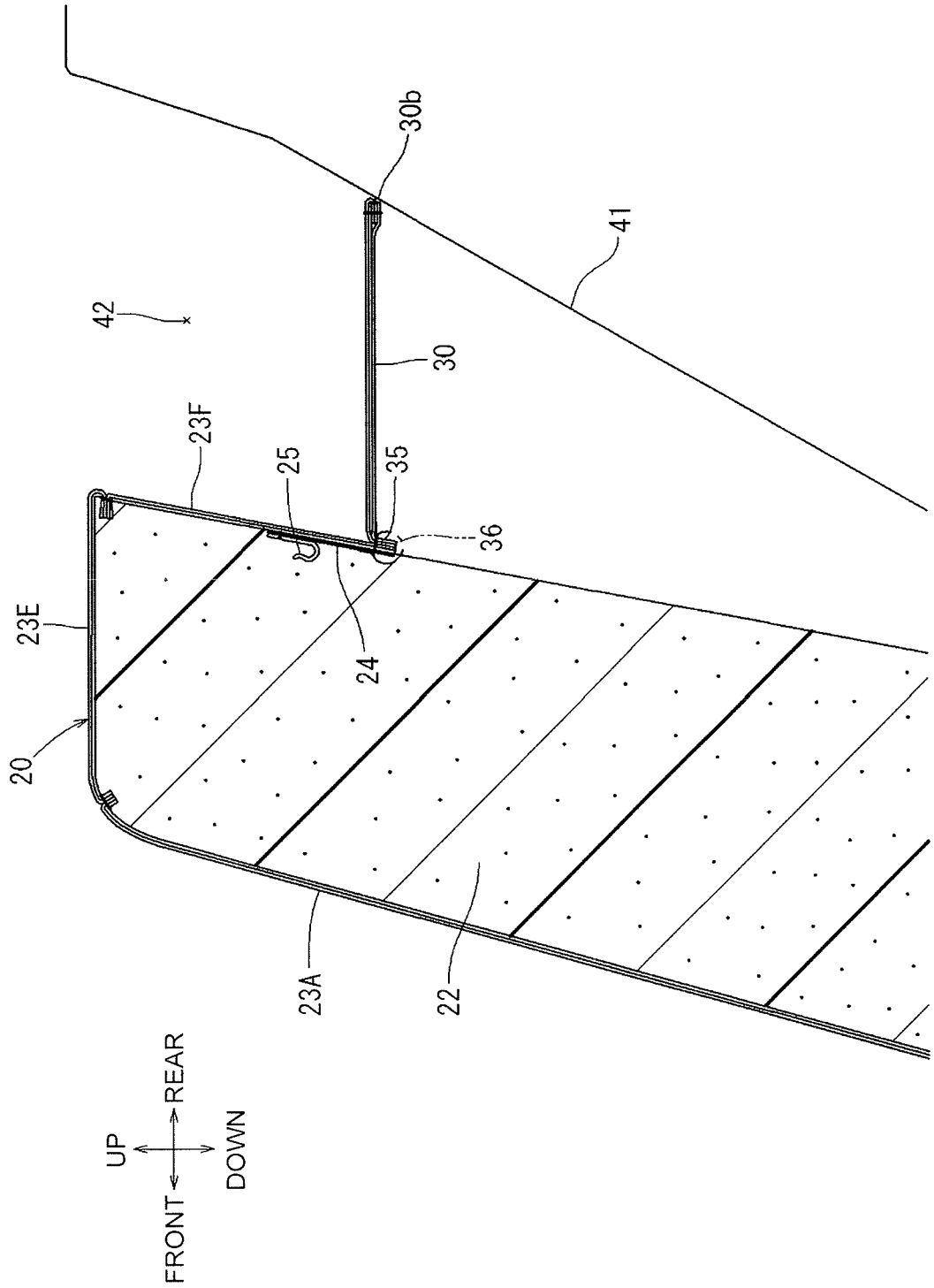
FIG. 6 is a sectional view illustrating a state where a backward tilting angle of the seatback is smallest in FIG. 4.
Figure 7:
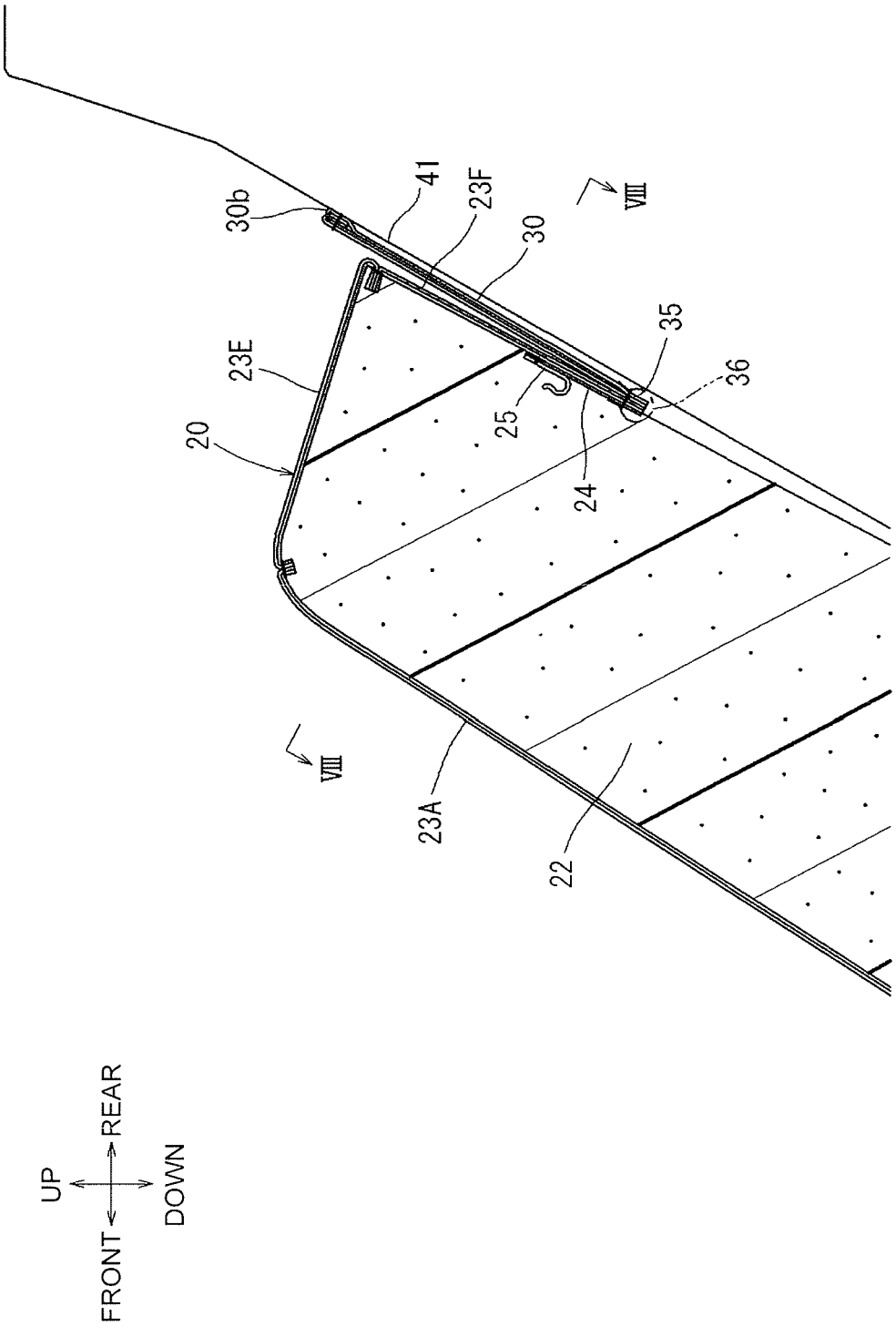
FIG. 7 is a sectional view illustrating a state where the backward tilting angle of the seatback is largest in FIG. 4.
Figure 8:
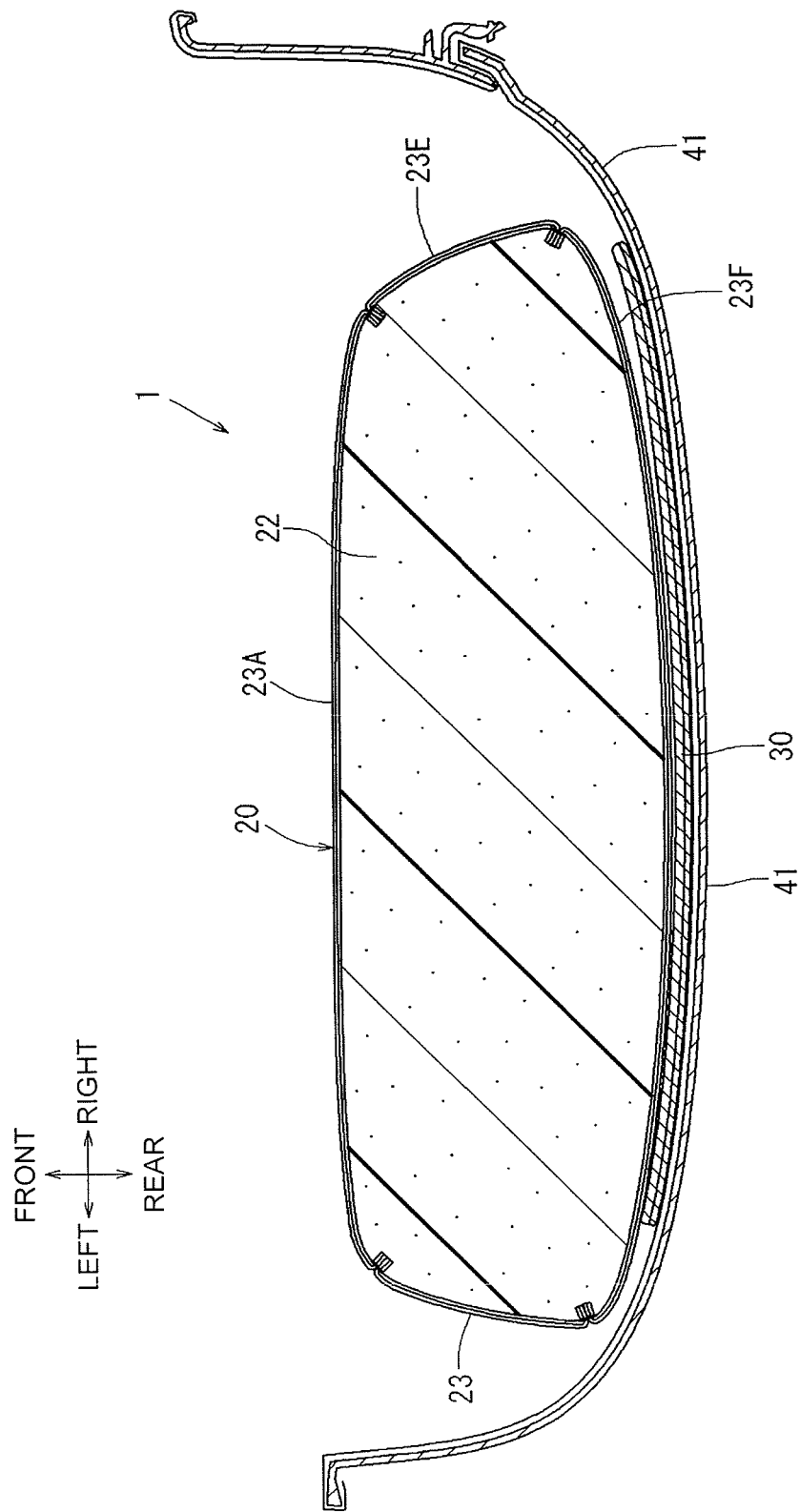
FIG. 8 is a sectional view taken along a line VIII-VIII in FIG. 7.
Figure 9:
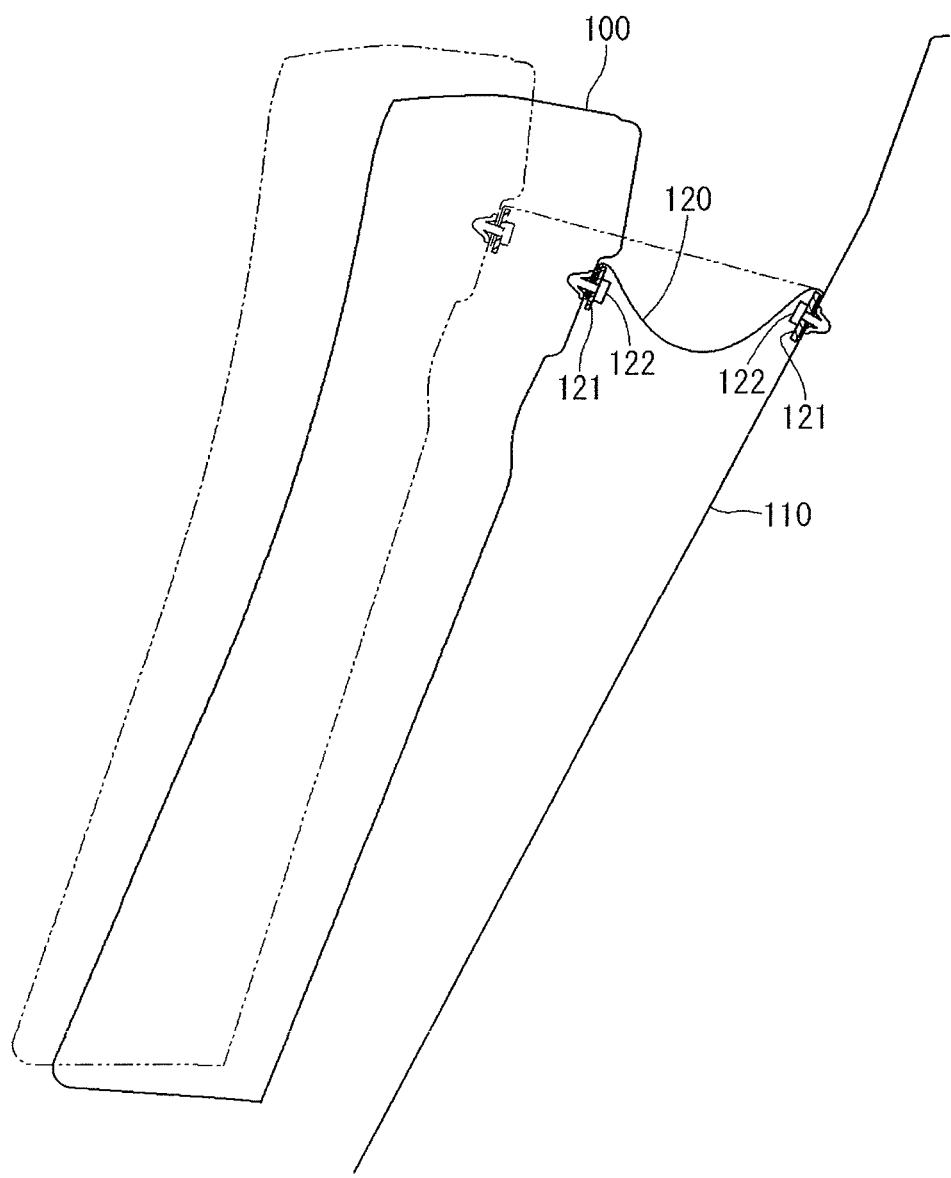
FIG. 9 is a sectional view corresponding to FIG. 4 and illustrates an attachment structure of a gap hiding cover in the related art.

As illustrated in FIGS. 3 to 5, the board member 30 is a flat-plate member configured such that both surfaces of a resin plate 31 are covered with a skin material 32. The resin plate 31 has a generally rectangular shape in a plan view. The resin plate 31 is obtained by cutting a flexible plate material made of polypropylene and having a plate thickness of 1 mm. Further, the resin plate 31 has a generally rectangular shape with its longitudinal direction being along the right-left direction in a plan view, and right and left rear corners are formed into an curved shape along a shape of a front surface portion of a partition trim 41 (described later). A material of the resin plate 31 is not limited to polypropylene resin, but may be other resin as long as the resin has flexibility and has rigidity such that the resin plate 31 does not deform by its own weight when the resin plate 31 made of such a kind of resin is supported by a front edge part 31*a* and a rear edge part 31*b*, which are two sides along the longitudinal direction. Further, the resin plate 31 may be replaced by a plate made of paper and the like if it has similar rigidity and flexibility. The skin material 32 is made of synthetic leather having the same color as the skin 23*a* in consideration of cost, but the skin 23*a* is also usable. Two skin materials 32 are cut into generally the same shape as the resin plate 31 with a margin to seam being secured in their outer peripheries. The two skin materials 32 are put on top of one another in a state where their front surfaces are opposed to each other, and then integrated by sewing the outer peripheries along a sewing line 33 except the front edge part 31*a* side. The two skin materials 32 thus integrated are reversed from the front edge part 31*a* side so that their front surfaces face outside. Then, the resin plate 31 is inserted between the skin materials 32 thus formed in a pouch-like shape from the rear edge part 31*b*, and integrated thereto by sewing the outer peripheries along a sewing line 34 except the front edge part 31*a*. The rear edge part 31*b* of the resin plate 31 is covered with the skin materials 32 so as to serve as a rear end 30*b* of the board member 30. In the skin material 32, aside corresponding to the front edge part 31*a* of the resin plate 31 corresponds to an example of a "first end side," and a side corresponding to the rear edge part 31*b* of the resin plate 31 corresponds to an example of a "second end side."

As illustrated in FIG. 5, the front edge part 31*a* side of the two skin materials 32 of the board member 30 are put on a lower end side of the back upper part 23F, and hingedly connected thereto by sewing along a sewing line 35 in an integrated manner. At this time, a reinforcement plate 24 is put on a back-pad-22 side surface of the lower end side of the back upper part 23F, and is sewn to the two skin materials 32 of the board member 30 together with the back upper part 23F. The reinforcement plate 24 is obtained by cutting a plate material made of polypropylene and having a plate thickness of 1 mm, similarly to the resin plate 31, and has a rectangular shape with its longitudinal direction being along the right-left direction in a plan view. A resin hook 25 is attached to a front face side of an upper end side of the reinforcement plate 24 by sewing. The reinforcement plate 24 is a member for reinforcing a sewing-line-35 part serving as a hinge portion of the board member 30 relative to the back upper part 23F and for fixing the sewing-line-35 part to the back frame 21. The fixation to the back frame 21 is performed such that the hook 25 is locked to a wire (not shown) integrated with the back frame 21. Note that the board member 30 is attached to the back upper part 23F before the back cover 23 is placed to cover the back pad 22. Here, the sewing line 35 corresponds to an example of an "attachment portion." Further, the rear end 30*b* of the board member 30 corresponds to an example of a "sliding portion." Furthermore, the resin plate 31 corresponds to an example of a "plate material."

Figure 2:
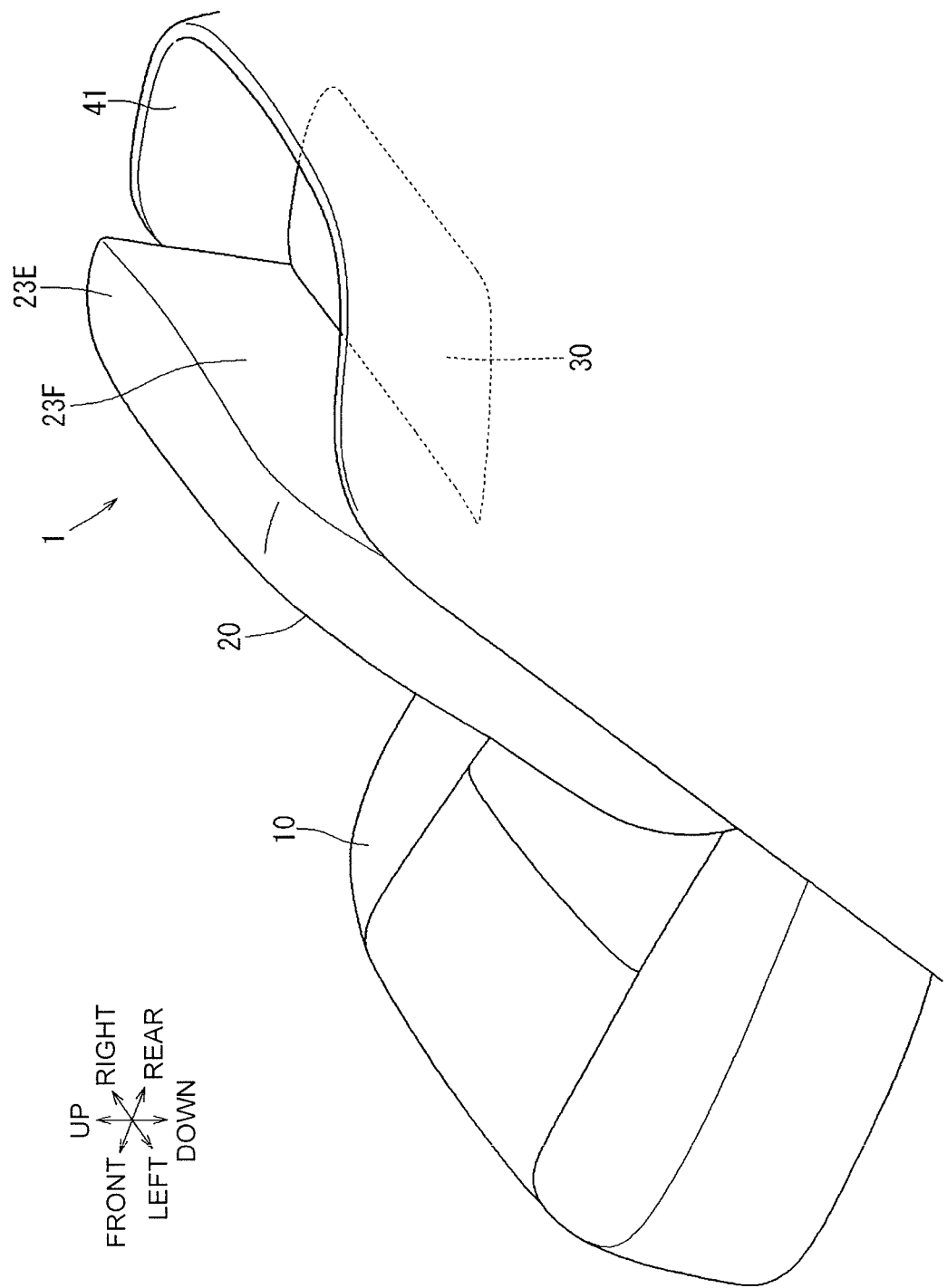
FIG. 2 is a perspective view of a seatback of the automotive rear seat according to the embodiment when viewed from a diagonally rear side.

As illustrated in FIGS. 1 and 4, a partition panel that partitions a passenger compartment from a trunk is disposed behind the automotive rear seat 1, and the partition trim 41 is attached to a front-lace side of the partition panel. The partition trim 41 is configured such that a decoration skin material is attached onto an external appearance surface of a core as a resin molded product, and its material component is similar to the board member 30. The partition trim 41 is formed in a shape to be recessed rearward so as to cover the rear face of the seatback 20 and rear sides of right and left side faces thereof when the seatback 20 is about to be tilted. As illustrated in FIGS. 2 and 4, when the seatback 20 is brought close to an upright state, a generally rectangular gap 42 having right and left rear corners formed into a curved shape in a top view is formed between a rear-face upper part of the seatback 20 and a front-face upper part of the partition trim 41. The board member 30 is disposed so as to cover the gap 42 to prevent a rear-face lower part of the seatback 20 and a front-face lower part of the partition trim 41 from being observed from an upper side and a diagonally upper side. Here, the partition trim 41 corresponds to an example of a "vehicle body."

As illustrated in FIGS. 1 to 4, the automotive rear seat 1 in which the back pad 22 is covered with the back cover 23 is attached at a predetermined position of the automotive body. At this time, the automotive rear seat 1 is attached while the rear end 30*b* of the board member 30 is pressed against the front surface portion of the partition trim 41. Hereby, as illustrated in FIG. 4, in a case where an inclination position of the seatback 20 is at a standard position, the board member 30 can be displaced by rotating downward by its own weight around the sewing line 35 as a hinge axis (as a center). The rotation is stopped in a state where the rear end 30*b* abuts with the front surface portion of the partition trim 41. This state is a state where the board member 30 is unfolded.

With reference to FIGS. 4 to 8, an operation and an effect of the board member 30 along with the tilting of the seatback 20 are described. When the seatback 20 is tilted forward from a state where the inclination position of the seatback 20 is placed at the standard position as illustrated in FIG. 4, the rear end 30*b* of the board member 30 slides downward while abutting with the front surface portion of the partition trim 41, and enters a state illustrated in FIG. 6. At this time, a backward tilting angle of the seatback 20 is smallest and the gap 42 most expanded (separated) in the front-rear direction between the seatback 20 and the partition trim 41. The gap 42 is covered by the unfolded board member 30, so that a lower part of the seatback 20 is hidden from outside. At this time, in the section illustrated in FIG. 6, the board member 30 is generally horizontal, so that the sewing line 35 and the rear end 30*b* are placed at generally the same height position. When the seatback 20 is tilted backward from the state where the inclination position of the seatback 20 is placed at the standard position as illustrated in FIG. 4, the rear end 30*b* of the board member 30 slides upward while abutting with the front surface portion of the partition trim 41, and enters a state illustrated in FIG. 7. At this time, the backward tilting angle of the seatback 20 is largest, so that the board member 30 is sandwiched by the gap 42 narrowest (closest) in the front-rear direction between the seatback 20 and the partition trim 41. At this time, like a horizontal section illustrated in FIG. 8, the board member 30 is deformed due to its flexibility, so that its shape is curved along a back face of the seatback 20 on an opposite side to a sitting face and the front surface portion of the partition trim 41. Thus, the gap 42 between the seatback 20 and the partition trim 41 is always covered by the board member 30 unfolded and folded between a state of the smallest backward tilting angle of the seatback 20 and a state of the largest backward tilting angle thereof, thereby making it possible to achieve a good outward appearance.

Further, the attachment of the board member 30 to the automotive body is performed such that the automotive rear seat 1 in which the board member 30 is attached to the back upper part 23F of the seatback 20 by sewing is attached in a state where the rear end 30*b* of the board member 30 is brought into contact with the partition trim 41. Hereby, a good attachment workability of the board member 30 to the automotive body is obtained. Further, the board member 30 is formed such that the resin plate 31 is covered with two skin materials 32, so the board member 30 is lightweight and has a good outward appearance. Further, since the board member 30 has flexibility, the board member 30 can be folded by curving along a projecting shape of the back face of the seatback 20, so that the gap between the seatback 20 and the partition trim 41 is covered efficiently and the outward appearance improves.

Note that, as indicated by an alternate long and two short dashes line in FIGS. 4 to 7, a spring member 36 that rotatably biases the board member 30 clockwise around the sewing line 35 can be disposed between the reinforcement plate 24 and the board member 30: Hereby, the rear end 30b of the board member 30 is more surely pressed against the front surface portion of the partition trim 41, so that the gap can be covered stably.

A specific embodiment has been described above, but the disclosure is not limited to the appearance and the configuration described in the above embodiment, and various modifications, additions, and deletions are performable as far as they do not change the gist of the disclosure.

In the above embodiment, the sewing line 35 as the attachment portion is disposed on the seatback 20 side, and the rear end 30b of the board member 30 as the sliding portion is brought into contact with the partition trim 41 side. However, conversely, the sewing line 35 as the attachment portion may be disposed on the partition trim 41 side, and the rear end 30b of the board member 30 as the sliding portion may be brought into contact with the seatback 20 side.

In the above embodiment, the board member 30 is disposed between the seatback 20 and the partition trim 41. However, the present disclosure is not limited to this, and the board member 30 can be disposed between other automotive seat component parts and the automotive body, e.g., between the seat cushion 10 and an automotive floor.

In the above embodiment, the sewing line 35 is employed as the attachment portion. However, the present disclosure is not limited to this, and the skin 23a of the back upper part 23F and the skin material 32 of the board member 30 may be connected to each other by mechanical means such as a clip. Further, if the skin 23a and the skin material 32 are made of a material that melts by heat, they may be connected to each other by means such as heat welding and ultrasonic wave welding.

In the above embodiment, the present disclosure is applied to a seat for an automobile, but may be applied to seats to be provided in an airplane, a ship, a train, and the like.

What is claimed is:

1. A vehicle seat comprising:
a component part formed to be displaceable relative to a vehicle body; and
a board member configured to cover a gap formed between the component part and the vehicle body, wherein:
the board member is a flexible member, is placed between the component part and the vehicle body, and the board member is configured as a plate material made of resin that is covered with a skin material, and includes:
an attachment portion configured to rotatably connect the board member to the component part or the vehicle body; and
a sliding portion configured to rotate around the attachment portion as an axis so as to abut with the vehicle body or the component part and slide according to a displacement of the component part.

2. The vehicle seat according to claim 1, wherein:
in a state where the component part is separated from the vehicle body, the board member is unfolded to cover the gap; and
in a state where the component part comes closer to the vehicle body, the board member is folded toward the component part or the vehicle body to which the board member is connected.

3. The vehicle seat according to claim 1, wherein the board member is biased to rotate in an unfolded direction.

4. The vehicle seat according to claim 1, wherein:
the component part is a seatback tiltable relative to the vehicle body; and
the board member covers the gap formed between an upper part of the seatback and the vehicle body.

5. The vehicle seat according to claim 1, wherein:
the component part is a seatback tiltable relative to the vehicle body;
the attachment portion is a sewing line formed such that a first end side of the skin material is connected by sewing to a skin of a back face of the seatback; and
the sliding portion is a second end of the skin material, the second end being configured to slide over the vehicle body.

6. The vehicle seat according to claim 1, wherein:
the component part is a seatback tiltable relative to the vehicle body;
a horizontal section of a back face of an upper part of the seatback is formed into a projecting shape which projects toward an opposite direction to a sitting face; and
the board member is configured to curve along the projecting shape when the board member comes closer to the back face of the seatback in an overlapped manner.

\* \* \* \* \*